United States Patent [19]

Motoori

[11] Patent Number: 5,272,588
[45] Date of Patent: Dec. 21, 1993

[54] SURGE PROTECTOR
[75] Inventor: Hideyuki Motoori, Yokohama, Japan
[73] Assignee: Fujitsu Limited, Kanagawa, Japan
[21] Appl. No.: 475,589
[22] Filed: Feb. 6, 1990
[30] Foreign Application Priority Data Mar. 1, 1989 [JP] Japan .................................. 1-023483

[51] Int. Cl.⁵ ............................................. H02H 9/04
[52] U.S. Cl. ...................................... 361/119; 361/91; 361/111; 361/120
[58] Field of Search ................. 361/91, 111, 117, 118, 361/119, 120, 129, 130, 56

[56] References Cited

U.S. PATENT DOCUMENTS

| | | | |
|---|---|---|---|
| 4,023,071 | 5/1977 | Fussell | 361/56 |
| 4,068,277 | 1/1978 | Simokat | 361/55 |
| 4,758,920 | 7/1988 | McCartney | 361/119 |

FOREIGN PATENT DOCUMENTS 0202034 8/1989 Japan ................................. 361/119

OTHER PUBLICATIONS

Fujioka, Lighting Protection for New PCM-24 Repeater Kenkyu Jitsuyoka Hokoku, Japan vol. 30, No. 12 pp. 2895-2910 (1981).
Fumihiko Deguchi et al., "Lighting Surge Protection Design for Subscriber Line Interface Circuits in D70 Digital Switching System", Review of the Electrical Communication Laboratories, vol. 33, No. 2, 1985.
Takafumi Kajiwara et al., "Circuit Design of Surge Protector for 200 kb/s Ping-Pong Transmission Equipment", Review of the Electrical Communication Laboratories, vol. 33, No. 2, 1985.

Primary Examiner—Steven L. Stephan
Assistant Examiner—Adolf Berhane
Attorney, Agent, or Firm—Armstrong, Westerman, Hattori, McLeland & Naughton

[57] ABSTRACT

The present invention relates to a surge protector for suppressing a surge voltage generated on transmission lines, having an object to prevent system shut-down by grounding detected by terminal equipment at the time of suppressing a surge, using a discharge tube for suppressing intermittently a surge voltage. The surge protector of the present invention comprises a first suppressing means comprising a penta-electrode discharge tube having first positive and negative electrodes and second positive and negative electrodes, any one of which is operatively connected to first input terminals and to a grounded grid electrode; a switch means one end of which is operatively connected to the first positive electrode or negative electrode and the other end to said second input electrode; and an ON-OFF switch control means which is operatively connected to said second positive and negative terminals to control the ON-OFF operations of said switch means; and a second suppressing means comprising first and second resistor means connected respectively in series to said transmission lines and a metal oxide varistor which is connected in parallel with said transmission lines to suppress a surge voltage by converting it into heat.

9 Claims, 4 Drawing Sheets

100 SURGE PROTECTOR

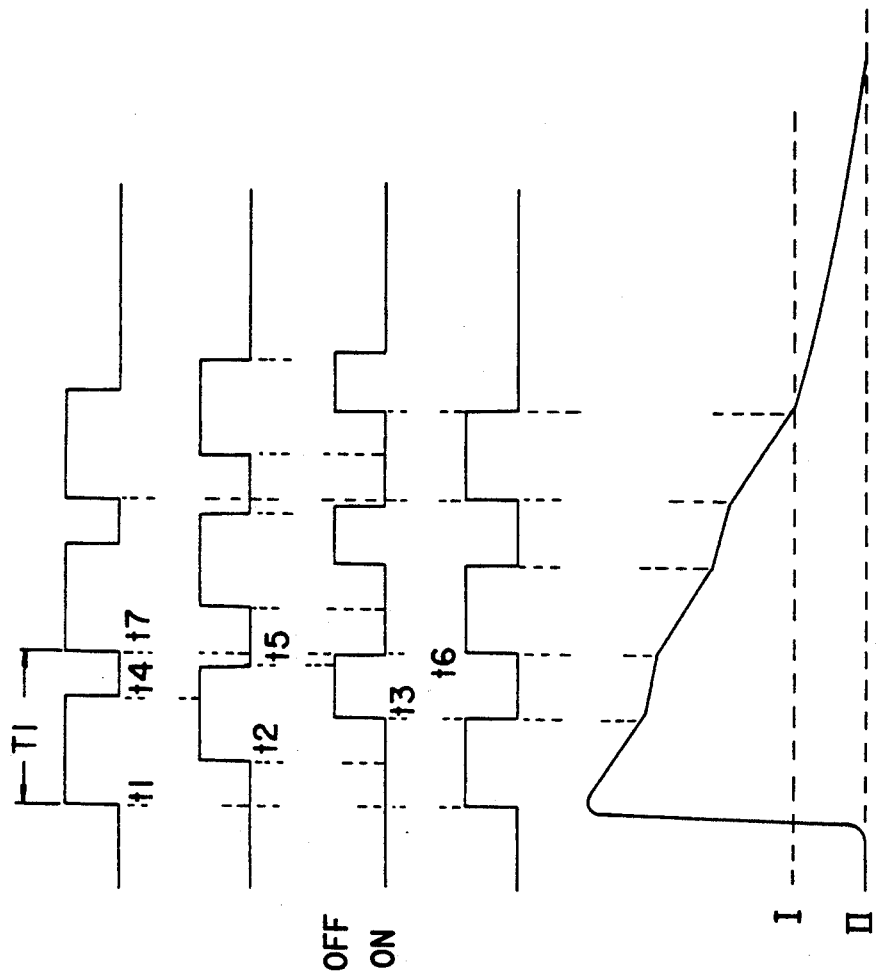

SURGE PROTECTOR

BACKGROUND OF THE INVENTION

The present invention relates to a surge protector for suppressing surge voltage generated on a transmission path, etc. and more specifically to a surge protector to suppress a high surge voltage of long duration due to the lightning, etc. with a discharge tube.

A wired transmission of a known configuration is first shown in FIG. 1. This system is structured by terminal equipment 1, 2 and a plurality of intermediate repeater equipment 3. The terminal equipment 1 comprises a U/B converter 11 which transmits a data signal by converting a unipolar signal to a bipolar signal, a B/U converter 12 for converting the received data from a bipolar signal to a unipolar signal, transformers 13, 14 which convert voltage, a constant current supply circuit 15 which supplies power to an intermediate repeater 3 through transmission paths 5, 6, a shut-down circuit 16 which detects the ground potential on the transmission paths 5, 6 through the constant current supply circuit 15 and a switch 17. The terminal equipment 2 comprises a U/B converter 22, a B/U converter 24 and transformers 21, 23 which convert voltage. Moreover, each intermediate repeater 3 comprises surge protectors 33-36 provided at the exit and entrance from/to the transmission paths 5, 6, transformers 37-40, repeating amplifier circuits 31, 32, a zener diode 43 and a protection resister 42 for supplying power to the repeating amplifier circuits and a metal oxide varister 41 for suppressing surge voltage to the zener diode. The structure of surge protectors 33-36 is shown in FIG. 2. As shown in this figure, a conventional surge protector is structured by a gas-filled triple-pole discharge tube 301, a metal oxide varister 304 and protection resistors 302, 303 for protecting the metal oxide varister.

In the system described above, a constant current is usually superposed for transmission upon the signal transmitted over transmission paths 5, 6 for supplying power to the intermediate repeater 3. For this purpose, a constant current supply circuit 15 is employed. Moreover, the surge protectors 33-36 are respectively arranged at the input and output terminals of the transmission path of the intermediate repeater 3. When a surge is generated due to the lightning, for example, on each transmission path, such a surge voltage is suppressed. Provided moreover at terminal 1 is a shut-down circuit 16 for suspending supply of power to the intermediate repeater 3 when grounding due to breakdown of the transmission path is detected and wherein such grounding is continued for a predetermined time of T1 or longer. A switch 17 turns ON when grounding is detected continuously for the predetermined period T1 by the shut-down circuit, and interrupts the power supply by supplying an earth level potential to the constant current supply circuit 15.

Operations of surge protectors according to the Prior Art will now be explained. The metal oxide varister 304 is used for suppressing solely a generated surge. In this case, the voltage due to a surge is applied to the metal oxide varister through protection resistors 302, 303 in order to suppress the surge. The gas filled tri-electrode discharge tube 301 is used for high and long duration surges. Operations are explained hereunder. In the event that a high voltage surge is generated by lightning across transmission lines a and b, the gas-filled tri-electrode discharge tube starts discharging. Since the grid of the tri-electrode discharge tube is grounded, the transmission lines a, b are respectively earthed by the discharge and thereby the surge voltage is suppressed. Thereafter, when the voltage is lowered to a constant value, discharging stops, and any residual voltage is suppressed through heat radiation by the metal oxide varister 304.

As described above, the conventional surge protector causes the gas-filled discharge tube to start discharging whenever a high voltage surge is generated. In this case, the transmission lines a, b become set to an equivalent condition as that of the grounded grid 305, resulting in the condition that the transmission lines a, b are also grounded during the duration of the discharge. In transmission systems utilizing the conventional surge protector, if the grounding time of the transmission lines a, b exceeds the predetermined time T1 during which grounding is detected by the shut-down circuit 17 provided at the terminal 1, the power supply to the intermediate repeater 3 stops. Termination of the power supply by the shut-down circuit 17 should intrinsically be controlled whenever a fault occurs on the transmission line. However, conventional transmission systems utilizing the surge protector according to the Prior Art provide a problem that the power supply is discontinued even when a fault such as disconnection of transmission line is not generated. If power failure occurs as described above, the cause must be determined and maintenance carried out. Thereafter, the power supply is started again. But, the conventional system utilizing the surge protector of the Prior Art conducts such troubleshooting even when faults are not generated and restarts the power supply after it is determined that faults have not occurred. In this case, the system operation stops even while the data transmission is still naturally possible, resulting in a serious problem that operation efficiency is deteriorated and reliability to user is also lowered considerably.

SUMMARY OF THE INVENTION

It is an object of the present invention to provide a surge protector which suppresses a surge voltage without continuous long term discharge of a gas-filled discharge tube and does not suspend power supply with the operation thereof.

It is another object of the present invention to provide a data transmission system which realizes efficient data transmission and improves reliability to users by utilizing a surge protector.

In carrying out the present invention in one preferred mode, the surge protector of the present invention comprises a penta-electrode discharge tube 114 providing first positive and negative electrodes 119, 120, second positive and negative electrodes 121, 122, where such electrodes are connected functionally to any one of a 2-wire type transmission line connecting the surge protector connected thereto, and a grounded grid electrode 118; a switch means 113, one end of which is connected to the first positive electrode 119 or negative electrode 120 while the other end thereof is connected to the other line of the 2-wire type transmission line; and an ON-OFF switch control means 110 which is functionally connected with the second positive and negative electrodes 121, 122 to control the ON-OFF operation of the switch means 113.

BRIEF DESCRIPTION OF THE DRAWINGS

FIGS. 4A–4E show operations of the main parts of the surge protector shown in FIG. 3.

DESCRIPTION OF THE PREFERRED EMBODIMENT

Figure 3:
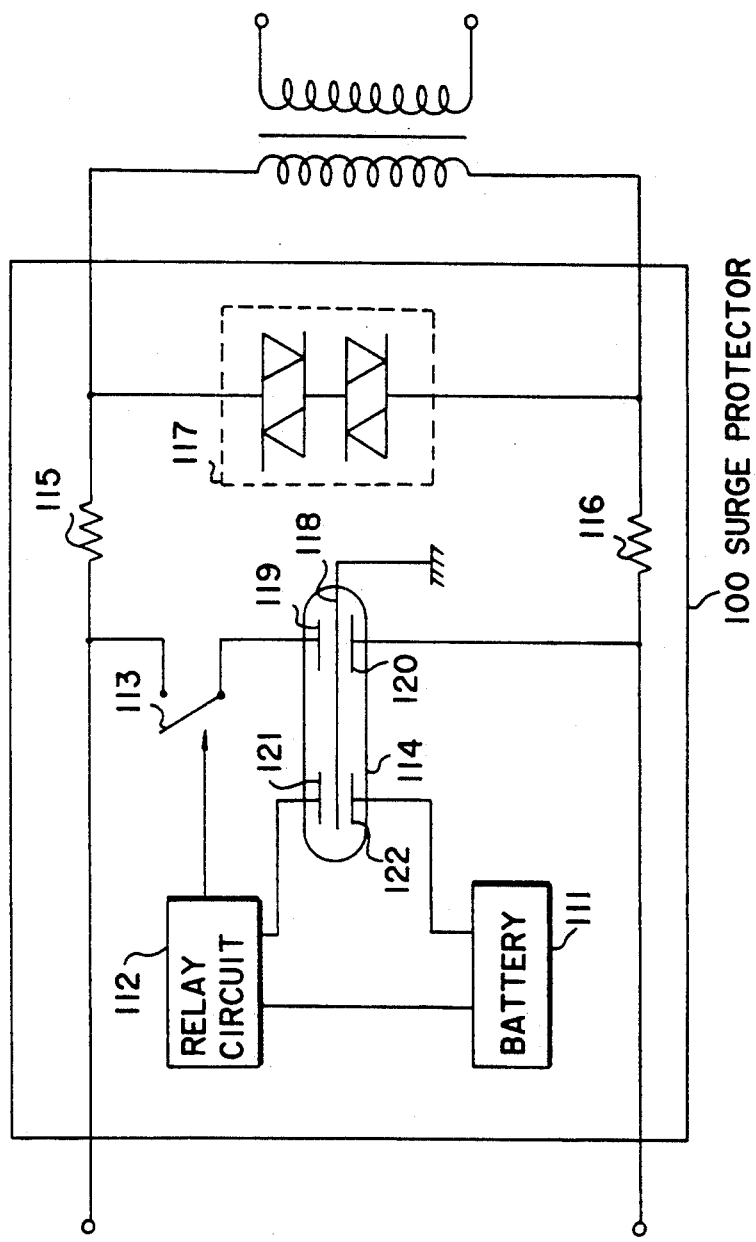
FIG. 3 shows an embodiment of a surge protector of the present invention.

FIG. 3 shows an embodiment of the present invention. In this figure, numeral 100 designates a surge protector comprising a switch ON-OFF controller 110 consisting of a battery 111 and a relay circuit 112. Numerals 114, 113 designate a penta-electrode discharge tube and switch therefor; 115, 116, a carbon film resistor; 117, metal oxide varister; and 118–122, electrodes of the penta-electrode discharge tube 114. FIG. 4A shows the discharge condition of the first positive and negative electrodes 119, 120 of the penta-electrode discharge tube 114; FIG. 4B, the discharge condition of the second positive and negative electrodes 121, 122 of the penta-electrode discharge tube 114; FIG. 4C, the ON/OFF condition of the switch 113; FIG. 4D, the grounding condition of the transmission lines a, b; and FIG. 4E, the surge voltage residual condition of transmission lines a, b. The discharge tube 114, battery 111, relay circuit 112 and switch 113 form a first surge suppressing means. The carbon film resistors 115, 116 and metal oxide varister 117 form a second surge suppressing means. The present invention will be explained in detail with reference to the accompany drawings.

In ordinary wired data transmission systems, a voltage difference 6 V is generated between the transmission lines a, b to supply electrical power to a plurality of intermediate repeaters. It is assumed that a surge voltage of 350 V is generated due to the lighting, etc. In the event that a surge voltage occurs, the first positive and negative electrodes 119, 120 of the penta-electrode discharge tube 114 start to discharge; and thereafter, the second positive and negative electrodes 121, 122 then also start to discharge. Thereby, the relay circuit 112 is operated, turning OFF the switch 113. (This switch 113 is normally in an ON state.) When the switch 113 turns OFF, the voltage is no longer generated at the first positive and negative electrodes 119, 120, and thereby the first positive and negative electrodes 119, 120 stop discharging. Moreover, when the first positive and negative electrodes 119, 120 stop discharging the discharge of the second positive and negative electrodes 121, 122 also stops, causing the relay circuit 112 to stop its operation. When the relay circuit 112 is stopped, the switch 113 turns ON, and thereby a voltage sent from the transmission lines a, b is generated on the first positive and negative electrodes 119, 120 and the discharge starts again. With repetition of the above-mentioned operations, the surge voltage on the transmission lines a, b is intermittently suppressed. During such operations, the surge voltage when the switch 113 is turned OFF is suppressed through thermal radiation by the metal oxide varister 117. This varister is naturally provided for suppressing extreme surge voltages. The present invention utilizes the characteristics of the penta-electrode discharge tube, namely wherein one pair of positive and negative terminals is effectuated by the other pair of positive and negative terminals.

Figure 1:
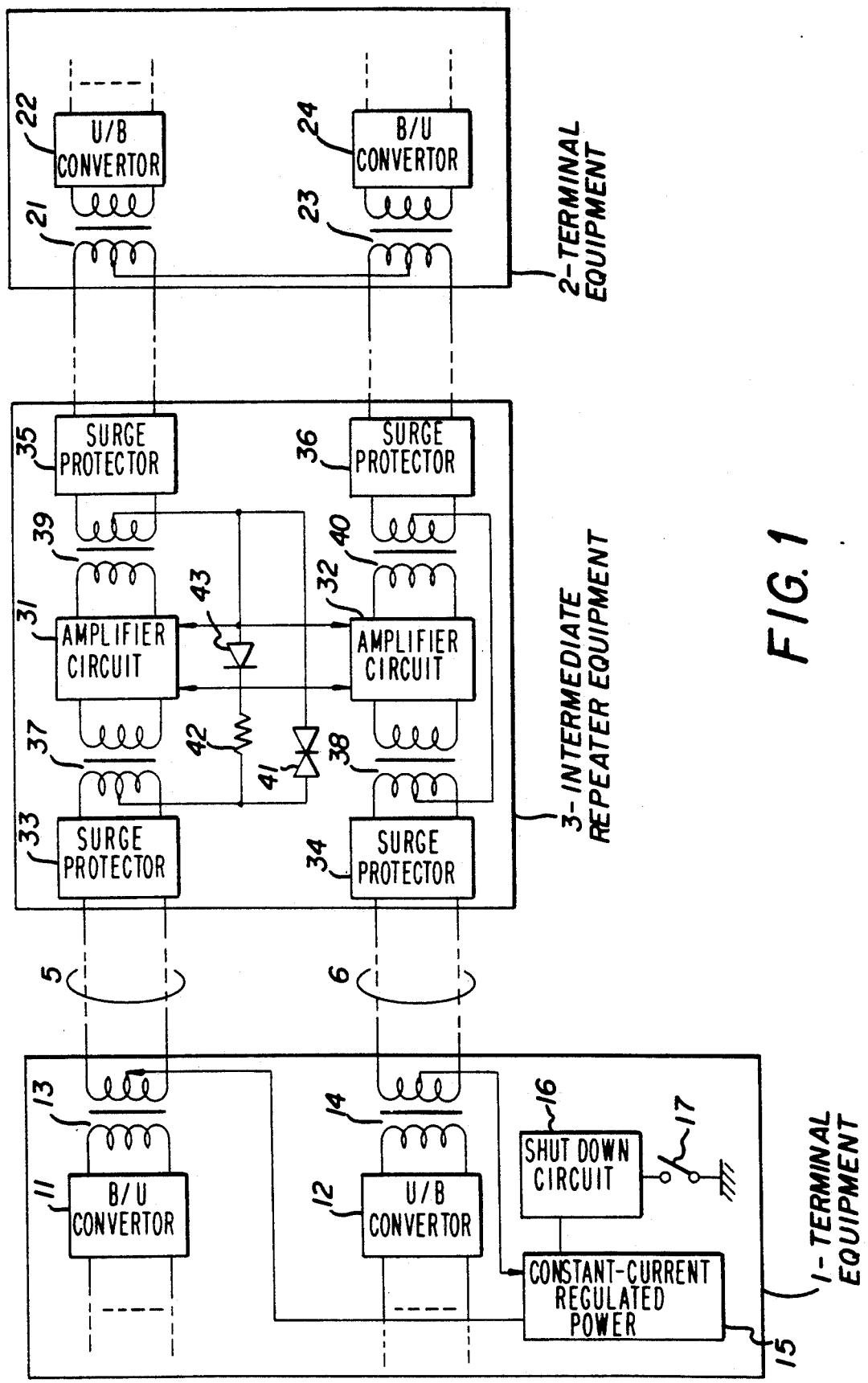
FIG. 1 shows an outline of a wired transmission system according to the Prior Art.
Figure 2:
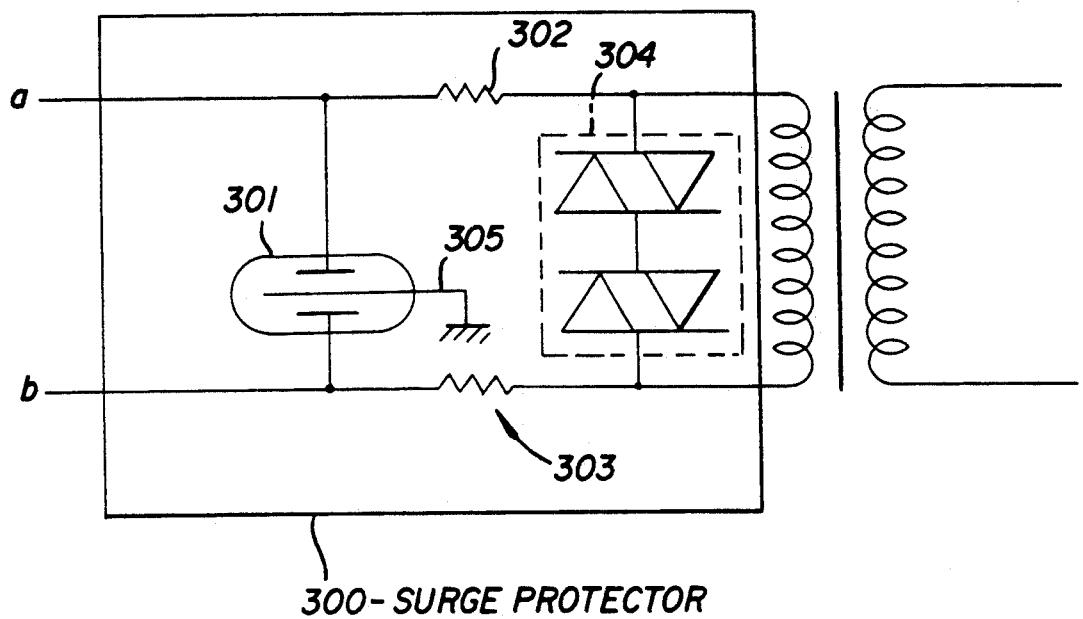
FIG. 2 shows a structure of the intermediate repeater of the wired transmission system shown in FIG. 1.

An embodiment of the present invention will be explained by referring to the timing diagrams shown in FIG. 4. First, a predetermined time of detection of grounding is defined as T1, in which case the power supply to the intermediate repeater 3 of the shut-down circuit 16 of FIG. 1 is suspended. Moreover, when the period from the discharge starting time $t_1$ of the first positive and negative electrodes 119, 120 of the penta-electrode discharge tube 114 to the time $t_3$ in which the switch 113 turns OFF is defined as T2 (FIG. 4D), the time relation is as indicated hereunder.

$$T1 > T2 \quad (1)$$

FIG. 4A shows the discharge condition of the first positive and negative electrodes 119, 120. FIG. 4D shows the actual grounding detection time in the shut-down circuit 16. As described previously, this time is defined as T2 which is the period from the discharge start time $t_1$ of the first positive and negative electrodes 119, 120 of the penta-electrode discharge tube 114 to the time $t_3$, in which the switch 113 turns OFF.

In the explanation below, it is assumed that the surge voltage is generated at the time $t_1$.

(1) The first positive and negative electrodes 119, 120 start the discharge due to the generation of a surge voltage at a time $t_1$. Simultaneously, the transmission lines a, b are grounded and the surge voltage is suppressed.

(2) The second positive and negative electrodes 121, 122 start the discharge with the influence of discharge of the first positive and negative electrodes 119, 120 at a time $t_2$.

(3) A loop, including the battery 111 and relay circuit 112, is formed due to the discharge of the second positive and negative electrodes 121, 122.

(4) The relay circuit 112 is actuated since the power is supplied from the relay circuit 112 through the loop structure described above.

(5) The switch 113 turns OFF due to its being controlled by the operation of the relay circuit 112 at a time $t_3$. Simultaneously, surge suppression by the penta-electrode discharge tube 114 is stopped.

(6) When the switch 113 turns OFF, the first positive and negative electrodes 119, 120 stop discharging at a time $t_4$.

(7) The second positive and negative electrodes 121, 122 stop discharging at a time $t_5$ due to the influence of no discharge occurring across the first positive and negative electrodes 119, 120.

(8) When the second positive and negative electrodes 121, 122 stop discharging, the loop described above is reset and operations of relay circuit 112 stops.

(9) When the relay circuit 112 stops its operation, the switch 113 turns ON again at a time $t_6$.

(10) When the switch 113 turns ON, the first positive and negative terminals start discharging again at a time $t_7$. Simultaneously, the transmission lines a, b are grounded and the surge voltage can be suppressed.

With repetition of the above-mentioned operations, the surge voltage can be suppressed as shown in FIG. 4E through intermittent operations of the penta-electrode discharge tube as shown in FIG. 4E. During the period from the time $t_3$ to the time $t_7$, the voltage is converted to heat and radiated for suppression of surge in the second surge suppressing means comprising carbon resistors 115, 116 and metal oxide varister 117.

With operations as described above, the penta-electrode discharge tube stops discharging when the surge voltage reaches the predetermined surge voltage I because it becomes equal to or lower than the voltage necessary for causing the penta-electrode discharge tube to discharge. As described above, after the surge voltage becomes equal to the predetermined voltage I, the surge voltage is then gradually suppressed by the second surge suppressing means.

According to the present invention, the surge voltage can be intermittently suppressed by the operations of the penta-electrode discharge tube 114, battery 111, relay circuit 112 and switch 113. Therefore, the period in which the transmission lines a, b are continuously grounded becomes shorter than the grounding detection time T1 of the shut-down circuit. Moreover, erroneous interruption of the power supply to the intermediate repeater 3 by the surge voltage can be prevented. As a result reliability of the system for users can also be enhanced.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. In a data transmission system having a shut-down circuit with a predetermined grounding detection time period, a surge protector for suppressing a surge voltage above a predetermined threshold, comprising:
   first and second input terminals to which said surge voltage is input; and
   first suppressing means including a penta-electrode discharge tube having first positive and negative electrodes, either one of which is operatively connected to said first input terminal and to a grounded grid electrode,
   wherein said first suppressing means further includes a switch means, one end of which is operatively connected to said first positive electrode or negative electrode and the other end is operatively connected to a second positive electrode,
   wherein said discharge tube is operatively connected to said first and second input terminals for intermittently suppressing said surge voltage input to said terminals,
   wherein said first suppressing means repetitively and intermittently suppresses the applied surge voltage while said surge voltage decreases until reaching said predetermined threshold, and
   wherein each time period of voltage suppression is less than said predetermined grounding detection time period.

2. A surge protector according to claim 1, wherein respective lines of 2-wire type transmission line are operatively connected tot he first and second input terminals.

3. A surge protector according to claim 2 wherein said first suppressing means further includes
   an ON-OFF switch control means, operatively connected to said second positive electrode and to a negative electrode for controlling the ON-OFF operations of said switch means.

4. A surge protector according to claim 3 wherein said ON-OFF switch control means includes:
   a relay circuit, operatively connected to one electrode terminal of said second positive and negative electrodes for controlling the ON-OFF operations of said switch means; and
   a battery means, operatively connected to another electrode of said second positive and negative electrodes and to said relay circuit for supplying power to said relay circuit.

5. A surge protector according to claim 2 further comprising:
   second surge suppressing means, operatively connected to said 2-wire type transmission line, for suppressing surge voltage while said first suppressing means is not operated.

6. A surge protector according to claim 5 wherein said penta-electrode discharge tube has first positive and negative electrodes and second positive and negative electrodes, any one of which is operatively connected to said first input terminal and to a grounded grid electrode, and wherein said first suppressing means further comprises:
   a switch means, one end of which is operatively connected to said first positive electrode or negative electrode while the other end is operatively connected to the second input terminals;
   an ON-OFF switch control means, operatively connected to said second positive and negative electrodes for controlling the ON-OFF operations of said switch means; and
wherein said second suppressing means comprises:
   first and second resistor means connected in series to said transmission lines; and
   metal oxide varister, operatively connected in parallel with said transmission lines for suppressing a surge voltage by converting said surge voltage into heat.

7. A surge protector according to claim 5 further comprising:
   terminal equipment means comprising a supply means for supplying power to said transmission line and a control means for suspending operation of said supply means in case the grounding of said transmission line is detected for the predetermined period T1 or longer, wherein;
   a period from start of discharge of the first positive and negative electrodes to the time when said switch means turns OFF is shorter than the predetermined period T1.

8. An intermediate repeater arrangement for a 2-wire type transmission line connecting a pair of terminal equipment devices to amplify and output an attenuated input comprising:
   means for shaping a waveform input signal and amplifying said input signal; and
   a surge protector comprising a penta-electrode discharge tube comprising first positive and negative electrodes and second positive and negative electrodes, wherein any one of said electrodes is operatively connected to one line of said 2-wire type transmission line and to a grounded grid electrode;
   a switch means operatively connected to said first positive electrode or negative electrode at one end thereof and to another line of said 2-wire type transmission line at the other end thereof and an ON-OFF switch control means for controlling ON-OFF operation of said switch means in order to intermittently suppress an incoming surge voltage in a repetitive manner.

9. A method of suppressing a surge voltage generated on a 2-wire type transmission line comprising the following steps:

discharging first positive and negative electrodes of a penta-electrode discharge tube connected to said 2-wire type transmission line through a switch means, said switch means being in an ON state, when a surge voltage is generated and then grounding the transmission line through a grid;

suppressing a surge voltage by discharging said first positive and negative electrodes and grounding the transmission lines and then discharging the second positive and negative electrodes;

discharging said second positive and negative electrodes to turn OFF said switch means;

turning OFF said switch means to stop discharge of said first positive and negative electrodes;

stopping discharge of said second positive and negative electrodes due to suspension of discharge of said first positive and negative terminals;

turning ON said switch means due to stoppage of discharge of said second positive and negative electrodes;

discharging again said first positive and negative electrodes; and suppressing intermittently a surge voltage by repeating the steps described above.

* * * * *